Aug. 21, 1951 O. WAHTERA ET AL 2,565,413

PHONOGRAPHIC RECORD CHANGING APPARATUS

Filed June 8, 1946 2 Sheets-Sheet 1

INVENTORS
Kenneth R. Scribner
Olavi Wahtera
BY Lawrence Burns
ATTORNEY

Aug. 21, 1951 O. WAHTERA ET AL 2,565,413

PHONOGRAPHIC RECORD CHANGING APPARATUS

Filed June 8, 1946 2 Sheets-Sheet 2

INVENTORS
Kenneth R. Scribner
BY Olavi Wahtera
Lawrence Burns
ATTORNEY

Patented Aug. 21, 1951

2,565,413

UNITED STATES PATENT OFFICE 2,565,413

PHONOGRAPHIC RECORD CHANGING APPARATUS

Olavi Wahtera, Peabody, and Kenneth R. Scribner, Ipswich, Mass., assignors to Sylvania Electric Products Inc., Salem, Mass., a corporation of Massachusetts Application June 8, 1946, Serial No. 675,468

3 Claims. (Cl. 274—10)

This invention relates to a mechanism for feeding disc phonograph records from a prearranged group into playing position upon a driven turntable and is directed particularly to such mechanism situated upon and functioning through a central supporting spindle.

It is a general object of the invention to provide a record changer of high operating efficiency.

A further object of the invention is to provide a record changer which is simple in construction and positive in action.

A further object of the invention is to provide a record changer which manipulates the records without engaging the record groove at any time thus completely avoiding damage to the record even after many playings thereof.

Other objects and features will more fully appear from the following description and will be particularly pointed out in the claims.

The invention is herein adapted to be applied to a record changer mechanism in combination with a motor driven phonograph turntable having a pick up arm provided with a suitable amplifier and loudspeaker to reproduce the sound track impressed upon the record.

However the invention may be applied to any type of phonograph.

The records it is desired to play are stacked in the desired order by threading them upon a specially constructed spindle which supports them above and in alignment with the axis of the turntable. The spindle is provided with retractable latchlike holding means projecting from the spindle and engaging the lower face of the bottom record of the stack thus supporting all of the records.

Directly above the latchlike holding means is an additional record holding means arranged frictionally to grip at least one of the records next above the bottom record. The friction gripping means comprises a short section of expandable material on the spindle normally having substantially the same diameter as the spindle. To actuate the friction gripping means the expandable material is compressed endwise thus to cause it to expand laterally into contact with the wall of the record aperture.

Any suitable means may be employed to actuate and coordinate the operation of the two record holding means. The expandable holding means may be actuated by rendering the upper portion of the spindle movable downward against the expandable material. The necessary motion to obtain this expansion may be derived from a cam device connected to a rodlike extension of the upper spindle section while the latch holding device may be projected and retracted by means of a member rotatable within the spindle.

To provide a better understanding of the invention a particular embodiment thereof will now be described and is illustrated in the accompanying drawings in which.

Figure 1:
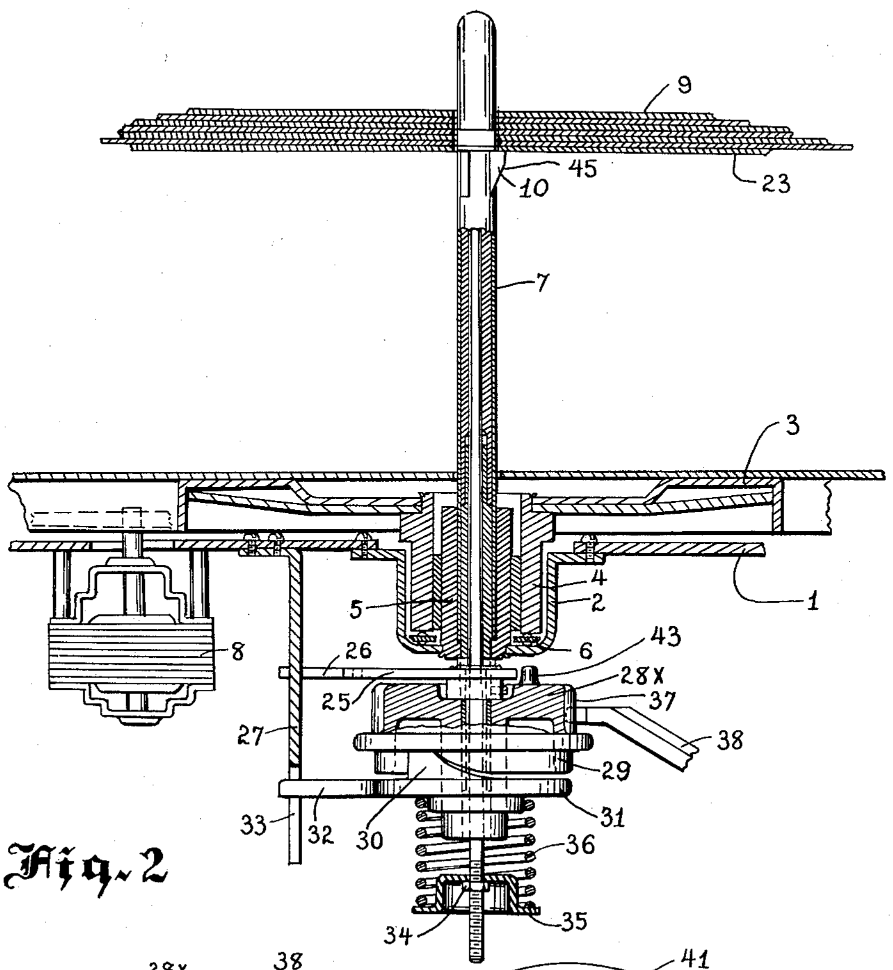
Figure 1 is a vertical sectional view of the apparatus.
Figure 2:
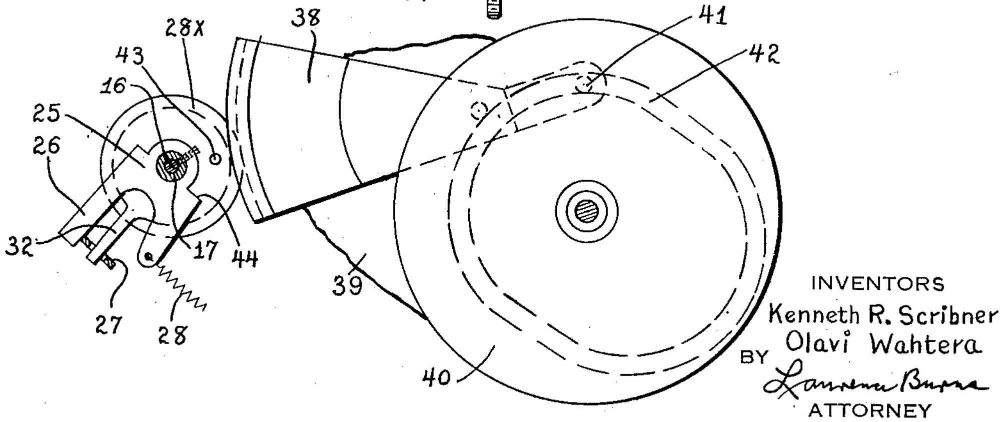
Figure 2 is a partial plan sectional view of the mechanism employed to actuate the record manipulating devices.

The mechanism of the present invention is adapted to be mounted upon the chassis 1 of an electrically operated phonograph but may be applied to any type of phonograph reproducing apparatus. The chassis 1 is provided with a bearing supporting cup 2 within which is located the bearing assembly for the record turntable 3. Any suitable bearing may be used. As shown the turntable is provided with a hub portion 4 having a relatively large axial bore within which is received a fixed hollow bearing stud 5 rigidly secured to the cup 2 and upon which the turntable has its bearing. Desirably an anti-friction bearing 6 is inserted between the bottom face of the hub 4 and the bottom of the cup 2. This bearing absorbs the weight of the turntable and that of the records played.

A hollow record holding spindle 7 extends upwardly to receive the records and downwardly axially through the stud 5. The outer shell of the spindle is fixed against rotation and may be arranged to have a limited amount of vertical movement which may be utilized to provide automatic starting and stopping of the turntable driving motor 8 when records are placed on the spindle and removed therefrom. This automatic motor control is not shown since it forms no part of the present invention. The motor 8 is provided with suitable speed reducing means which in turn engages the rim of the turntable 3.

The spindle 7 is provided at its upper end with means for supporting a stack of records 9 in a position sufficiently elevated above the turntable 3 to permit a record pick up arm, not shown, to play a record on the turntable.

Two independently controllable record holding means are provided on the spindle which when actuated in proper coordination feed one record at a time into playing position. While a particular means is shown herein for this purpose any suitable means may be employed which is within the scope of the claims appended hereto.

Figure 3:
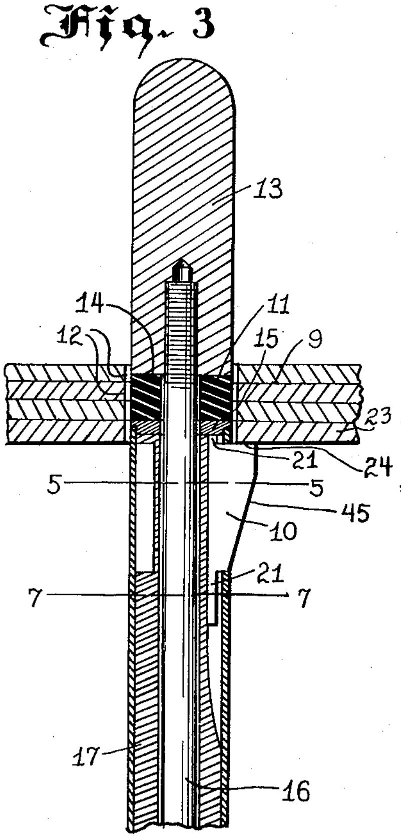
Figures 3 and 4 are enlarged sectional views of the record holding spindle.
Figure 4:
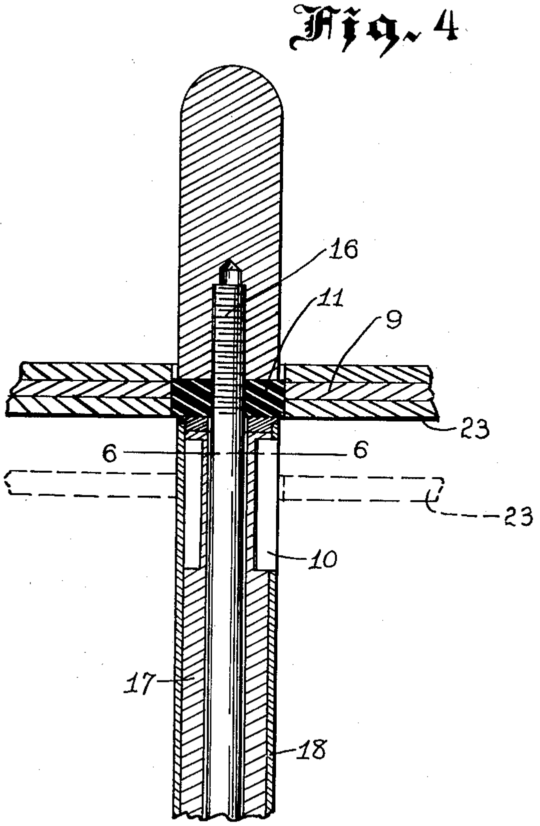
Figure 5:
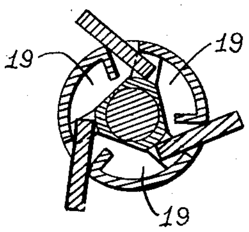
Figure 5 is a cross-sectional view taken on line 5—5 Figure 3.

One or more latchlike record holding members 10 are provided and arranged to be extended from and retracted within the spindle. When extended the members 10 act to support the stack of records when no record is being delivered to the turntable as shown in Figures 1, 3 and 5 of the drawings.

Above the members 10 a friction record holding device is located in position to engage one or more of the records next above the bottom record. The friction gripping means 11 is made of flexible expandable material and is so constructed and arranged as to constitute a short section of the spindle and has a diameter substantially the same as that of the spindle. Normally therefore the records when placed upon the spindle readily pass over the section 11 and are held by the members 10.

The expandable gripping member 11 may be made of rubber or other flexible material and means are provided to expand the material into contact with the wall of the record apertures 12 thus to grip the records.

A desirable means for expanding the member 11 is to make the upper portion 13 of the spindle axially movable with respect to the other portion of the spindle and to provide a shoulder 14 on the portion 13 to engage the upper face of the member 11 and a shoulder 15 on the lower portion of the spindle to engage the lower face of the member 11. By moving the shoulder 14 against the rubber 11 it is expanded to grip the record or records.

While in the embodiment of the invention shown the upper member 13 moves down, any means may be employed however to cause the shoulders 14 and 15 to expand the member 11 laterally. The member 13 is provided with a depending actuator rod 16 secured thereto or integral therewith. The rod 16 desirably extends axially through the spindle 7 and through the bearing stud 5 and projects a substantial distance below the bearing cup.

The record holding latch members 10 may be projected and retracted in any suitable manner. As herein shown the latch members 10 are actuated by a sleeve member 17 rotatable within the outer shell 18 of the spindle and through which the rod 16 extends. The sleeve 17 also extends downward below the bearing cup and is actuated by means to be described.

Figure 6:
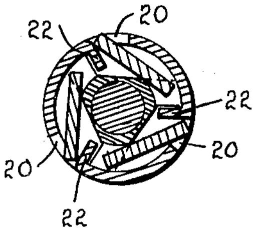
Figure 6 is a cross section taken on line 6—6 Figure 4.
Figure 7:
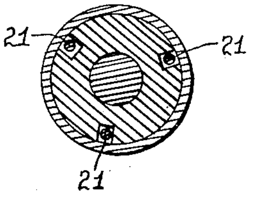
Figure 7 is a cross section on line 7—7 Figure 3.

The upper end of the sleeve 17 is cut away to form three recesses which form three chambers 19 within the shell as shown in Figures 5 and 6. The latch members 10 are received within the chambers 19 when retracted and are projected through vertical slots 20 in the shell 18 into holding position. The latches 10 themselves are desirably made in the form of right angled triangles with their apexes at the bottom. The top and bottom extremities of the latches are provided with trunnions 21 extending into journals in the sleeve 17 to permit the latches to pivot on a vertical axis and to provide the necessary connection to permit the latches to be manipulated by the sleeve 17.

Desirably one edge of the apertures 20 is extended inward to form lip 22. The lips act to direct the latches outward when they are projected into record holding position as shown in Figure 5. To retract the latches the sleeve 17 is rotated through a portion of a revolution until the latches are drawn into their chambers 19. The bottom record 23 of the stack 9 rests upon the upper edge 24 of the latches 10. The top edge 24 is situated below the bottom edge of the member 11 the thickness of a record.

Any suitable means may be employed to actuate the member 11 and the latches 10 to release a single record from the bottom of the stack. A satisfactory mechanism for this purpose is shown herein. The lower end of the sleeve 17 has secured thereto an operating lever 25. The lever is provided with a stop arm 26 which is normally held against a fixed stop 27, secured to the chassis 1, by a spring 28. When the arm 26 is against its stop the latch members 10 are in extended position as shown in Figure 5.

Below and in engagement with the lever 25 an upper cam member $28x$ is rotatively mounted upon the rod 16 and is provided upon its lower face with a cam track 29. The cam track 29 coacts with another cam track 30 upon a non-rotatable cam member 31 to provide downward movement of the rod 16 and member 13. The member 31 has a stop arm 32 projecting into a vertical slot 33 in the fixed stop 27. The member 31 is held against rotation therefore but may move vertically along the rod 16. The lower end of the rod 16 is provided with screw threads upon which is received a nut 34 which acts to support a spring seat 35 upon which is seated the lower end of a spring 36 the upper end of which bears against the member 31.

Any desired means may be provided for rotating the cam member $28x$ such as by providing gear teeth 37 upon its periphery which mesh with the teeth upon a segmental lever 38 fulcrumed upon a rigid plate 39 upon which is rotatably mounted an operating cam 40. The outer end of the lever 38 is provided with a cam follower pin 41 received in a cam groove 42 on the bottom of the cam 40. The groove 42 is so designed that the toothed portion of the lever will rotate the member $28x$ a predetermined required amount. The member $28x$ is provided with a projection 43 extending upward from its top face into the plane of the lever 25. The lever 25 is provided with a driving shoulder 44 against which the projection 43 engages to drive the lever which in turn rotates the sleeve 17 to retract the latches 10.

The operating cam 40 constitutes an element which functions in the general operation of a complete apparatus for playing records and certain phases of its operation, with which the present invention is not concerned, are not shown or described. However, the cam track 42 is designed to cause actuation of the record feeding mechanism in correct timed relation to the other functions in the complete cycle of record playing and record changing.

The operation of the device is as follows. One or more records are placed upon the spindle 7 and the turntable is started rotating either automatically or otherwise through power derived from the motor 8. When it is desired to start playing a record one of the records in the stack 9 must be fed to the turntable. To accomplish this the cam 40 is started rotating either manually or automatically. Rotation of the cam 40 causes the lever 38 to rotate upon its fulcrum and thus rotate the cam member $28x$ in a clockwise direction. The motion of the member $28x$ causes the cam track 29 to coact with the cam track 30 to pull down on the rod 16 through the medium of the spring 36 and the spring seat 35. Thus the tension of the spring 36 is impressed upon the expandable member 11 causing it to grip and hold the record next above the bottom record 23. In so doing all of the records above the bottom record are held.

The projection 43 on the cam member 28x is so situated with respect to the cam tracks that a predetermined travel of the cam members takes place before the projection 43 engages the shoulder 44 on the arm 25. When the projection strikes the shoulder the arm is actuated, which in turn, retracts the latch members 11 which release the record 23. The record then drops into playing position upon the turntable.

Further travel of the cam 40 causes return movement of the lever 38 and return movement of member 28x. The spring 28 then acts to project the latch members 10 into holding position and subsequently the pressure on the member 11 is released thereby permitting the stack of records to move down onto the latches 10. To feed the next record the cycle of operation is repeated.

The lower cam member 31 being free to move axially along the rod 16 may continue its downward motion, induced by the interaction of the cam tracks 29 and 30, after the member 11 has expanded into contact with the wall of the aperture in the record. The further movement of the member 31 acts to compress the spring 36.

To remove the pile of records after they have all been played and are resting upon the turntable, the pile is lifted and when they engage the angularly disposed edge 45 of the latches 10 the latches are forced into retracted position thus permitting the records to be removed from the spindle.

We claim:

1. In a record changer for disc records having a driven turntable a hollow fixed main spindle at the axis of said turntable, said spindle including a plurality of slots at the record-support level, a plurality of latchlike record supports associated with said spindle and movable through said slots, a latch operating spindle rotatably mounted in said main spindle and upon which said latches are pivoted on axes parallel to the axis of said spindle, means to project and retract said latches by rotation of said rotatable spindle thereby to support or release records threaded on said spindle.

2. A record changer for disc records having the elements defined in claim 1 together with means for holding all but the bottom one of a stack of records on the spindle while the latchlike supports are releasing the bottom record into playing position.

3. In a record changer for disc records, a driven turntable, a fixed hollow main spindle at the axis of said turntable upon which a stack of records are held in non-playing position, a plurality of latches projectable through the wall of said main spindle acting to support the stack of records, a latch control spindle rotatable in said main spindle positively connected to and operable by rotation thereof to extend or retract said latches, an axially moveable upper section on said main spindle having an actuating rod extending downward axially through said latch operating spindle, an expandable spindle section between the upper and lower portions of said main spindle for holding, when expanded, all but the bottom record of the stack, and actuating means including timing adjustment for operating said latches and expanding spindle section to feed one record at a time into playing position.

OLAVI WAHTERA.
KENNETH R. SCRIBNER.

REFERENCES CITED

The following references are of record in the file of this patent:

UNITED STATES PATENTS

| Number | Name | Date |
|---|---|---|
| 2,287,098 | Habegger | June 23, 1942 |

FOREIGN PATENTS

| Number | Country | Date |
|---|---|---|
| 55,603 | Netherlands | Nov. 15, 1943 |
| 822,026 | France | Sept. 6, 1937 |
| 884,356 | France | Aug. 11, 1943 |